United States Patent [19]

Hallier

[11] 4,004,122
[45] Jan. 18, 1977

[54] MULTI-ZONE MICROWAVE HEATING APPARATUS

[75] Inventor: Bernard L. D. Hallier, St. Maur, La Varenne, France

[73] Assignee: International Standard Electric Corporation, New York, N.Y.

[22] Filed: Sept. 18, 1974

[21] Appl. No.: 507,097

[30] Foreign Application Priority Data

Nov. 6, 1973 France .................... 73.39317
Dec. 7, 1973 France .................... 73.43703

[52] U.S. Cl. .................. 219/10.55 A; 219/10.55 F
[51] Int. Cl.² ........................................ H05B 9/06
[58] Field of Search ............. 219/10.55 A, 10.55 R, 219/10.55 F

[56] References Cited

UNITED STATES PATENTS

| | | | |
|---|---|---|---|
| 2,888,542 | 5/1959 | Moak | 219/10.55 F |
| 3,336,142 | 8/1967 | Lawson | 219/10.55 A |
| 3,465,114 | 9/1969 | Bleackley et al. | 219/10.55 A |
| 3,474,212 | 10/1969 | White | 219/10.55 A |
| 3,505,490 | 4/1970 | Gorn | 219/10.55 A |
| 3,611,582 | 10/1971 | Hamid et al. | 219/10.55 A |
| 3,691,338 | 9/1972 | Chang | 219/10.55 R |
| 3,748,421 | 7/1973 | Peterson | 219/10.55 A |

FOREIGN PATENTS OR APPLICATIONS 1,145,285  3/1963  Germany

*Primary Examiner*—Bruce A. Reynolds
*Attorney, Agent, or Firm*—John T. O'Halloran; Thomas M. Marshall

[57] ABSTRACT

A microwave heating oven has a microwave-shielded loading passage and a first heating zone for containing the material in solid form. A second heating zone maintains the material in its liquid state and provides an exit passage for removing the material while in its liquid state. The oven finds particular application in the processing of materials for photographic emulsions where the emulsion material is placed in the first heating zone in solid form. The second heating zone is located directly under the first and is separated from the first by a perforated partition. Subjecting both heating zones to microwave radiation causes the solid emulsion material in the first zone to melt and to pass through the perforated partition to the second zone where the emulsion material is removed as a liquid.

10 Claims, 3 Drawing Figures

MULTI-ZONE MICROWAVE HEATING APPARATUS

FIELD OF THE INVENTION

The present invention relates to a device for thermal processing of materials.

BACKGROUND OF THE INVENTION

In certain material processings conditions are imposed which make it difficult to apply heating according to conventional processes. This is particularly true when any pollution of the material to be processed must be avoided, or when materials to be processed combine with refractory crucibles or other vessels wherein materials are processed. Other conditions may be imposed to produce quasi-instantaneous heating or to avoid any ambient heating or radiation.

Some of the materials for which thermal processing raises difficulties are sensitive emulsions, such as the emulsions utilized in photography. Therefore thermal processes are continually sought which safeguard the specific properties of the emulsions. Good results have been obtained by subjecting the emulsions to electromagnetic radiations. The French Pat. No. 803,064 filed on Mar. 9, 1936 and claiming prior filing on Mar. 22, 1935 in Germany describes such a process for photographic emulsions characterized by the fact that the emulsions are exposed, while being simultaneously cooled, to oscillations either during silver bromide formation or during a subsequent process. The aforementioned French Patent describes the specifications of this process. It consists of a supply of oscillating electric energy so that "emulsification, first digestion and further digestion" take place at 38° C, a temperature that is lower than the temperature needed for carrying those operations when thermal energy is supplied from a conventional heating process. In addition, the quality of the emulsion produced by the proposed process is better.

The French Patent specification describes waves generated by a transmitter with wavelength of hundred meters, and the application of microwaves in specific thermal processings is already known.

The above considerations have resulted in an invention for submitting sensitive substances to electromagnetic wave physical processing. This invention uses microwaves and comprises a first generator coupled to a predelimited operation space to deliver microwaves in a predelimited operation space, and a second generator for exposing substances to be processed to microwaves in the said predelimited operation space where the physical processing possibly converts the substances from a solid to a liquid.

SUMMARY OF THE INVENTION

According to a feature of the invention, the first generator comprises a microwave source, a magnetron, for example, coupled to a microwave cavity serving as predelimited operation space, the second comprises a container provided with an internal arrangement so as to separate the already processed substances from substances under processing. The container is provided with an internal arrangement made of a microwave permeable material so that coupling takes place in the area of the cavity.

According to a further feature of this invention active substances processed by microwaves comprise sensitive emulsions such as those used in photography.

According to another feature of this invention, there is provided a complete apparatus for melting photographic emulsions emulsified in gelatin, which operates as mentioned above and wherein the first generator comprises a plurality of magnetrons, each magnetron being individually coupled to the microwave cavity through a separate guide, where guide coupling apertures are located along a helical curve H on the cavity wall.

According to another feature, the apparatus comprises within a single enclosure the microwave cavity, the plurality of microwave sources, means for loading and unloading substances to be processed, coupling guides from sources to the cavity container, and a grid forming the above mentioned internal arrangement.

According to a further feature, the apparatus comprises, between each coupling guide and the associated magnetrons, a circulator for protecting the magnetrons against backward energy, which may be employed for switching a corresponding magnetron off as soon as the absorbed energy exceeds a certain threshold which may be absorption end signal for the dielectric medium constituted by the volume of substance to be processed.

One embodiment of this invention comprises a main casing including a container having three zones. In the first container zone constituting the loading zone, there are solid substances before processing. In the second container zone, substances which have to be submitted to a microwave melting process. In the third container zone, liquid processed substances are stored for removal from the apparatus. The second zone is the processing zone and the third zone is the discharge zone. Since microwave radiation must reach the substances through the container walls either in the second zone for processing them or in the third zone for still maintaining them at the liquid state up to evacuation from the apparatus, it is important that the microwave radiation be transmitted to the substances with minimum losses through the container walls. The container material, therefore, is permeable to microwave action as mentioned above.

The container is preferably a single molded piece made of polypropylene. The first container zone has a frusto-conical shape and the second zone is cylindrical. The second zone is separated from the third frusto-conical zone by a wall-grid maintaining solid particles at the higher lever (second zone). The well-grid separates processed substances which fall down through it in melted form to the lower level (third zone).

However when various sensitive substances ae successively processed within a container it may be contaminated with respect to another substance even if that other substance is only slightly different from the first processed substance. As a result the used container must be removed and replaced by a clean container for each kind of processed substances and even for each operation. The result is a substantial amount of time spent in removing and mounting internal containers, and an increase of operation cost when in a particular process the same processing is to be carried on in a same apparatus for a sequence of either different or inherently contaminating substances.

To overcome those drawbacks, the microwave permeable container comprises at least two independently removable parts.

According to another feature the internal container comprises only three parts: an upper part, an intermediate part and a lower part, the three parts being preferably molded and made of a microwave permeable plastic material such as polypropylene.

According to another feature the apparatus comprises:

an upper part having a cylindrical portion surmounted by an upwardly widening frusto-conical portion, an intermediate part made of a polypropylene grid having a diameter longer than upper cylindrical portion diameter and shorter than lower part diameter, and a lower part having a cylindrical portion of which the bottom is funnel-shaped, the said lower part being provided with two or more inwardly projections cooperating with external grid edges to center the said grid with respect to the lower part.

Other features of the present invention will appear more clearly from the following description of embodiments, the said description being made in conjunction with the accompanying drawings, wherein:

DESCRIPTION OF THE PREFERRED EMBODIMENT

Figure 1:
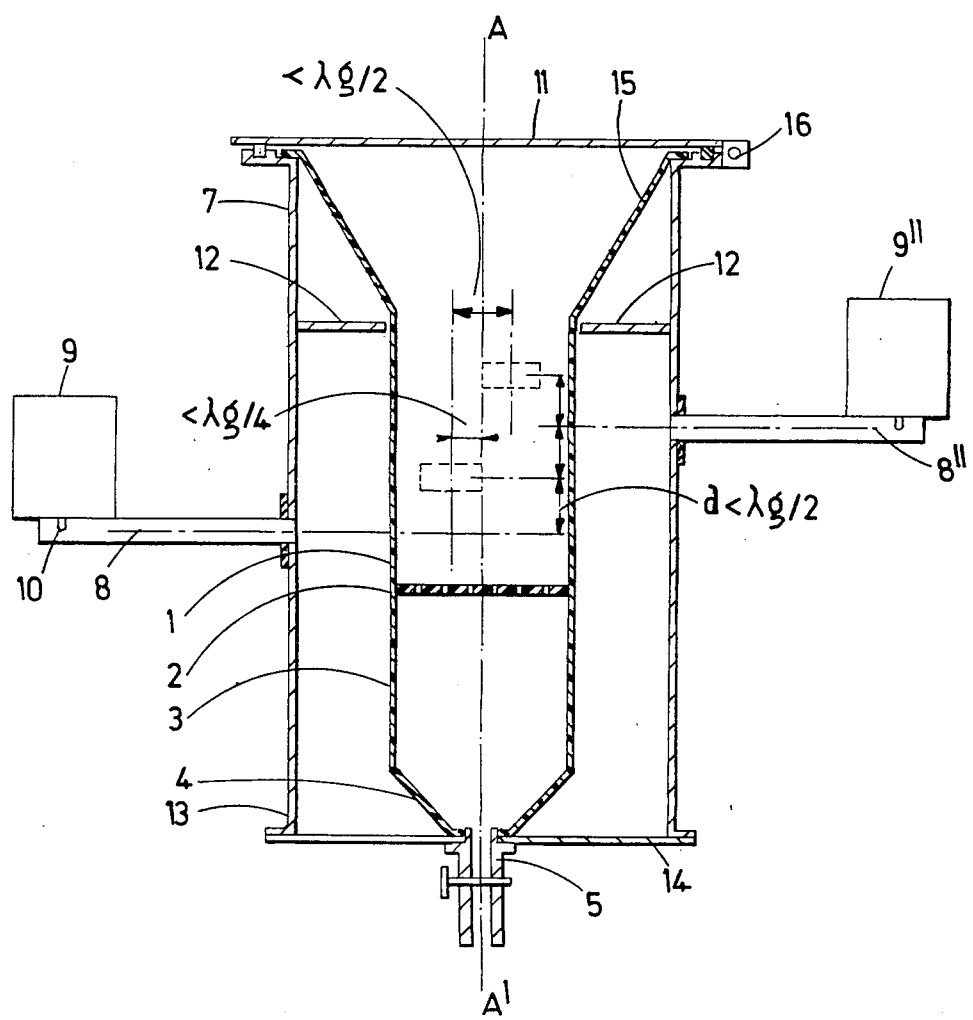
FIG. 1 is an axial cross-sectional view of the microwave oven of this invention.

FIG. 1 is an axial cross-sectional view of the apparatus which comprises a single block metal envelope 7-13 wherein located is a container 15-1-3-4 provided for containing substances to be processed. The container which may have any shape is made of material permeable to microwave radiation such as polypropylene for example. In the described embodiment the container has a surface of revolution about axis AA' of the apparatus. In each upper part, it comprises a frusto-conical loading space 15, in its intermediate part a processing cylindrical zone 1, in its lower part a post-processing cylindrical zone 3 and a frusto-conical unloading space 4. Finally it is provided with a grid 2 forming a separation between zone 1 and zone 3 for the processed substance. Metal envelope 7-13 comprises an upper portion 7 closed by a cover 11 which may be rotatable around a hinge 16 and a lower portion 13 having a top wall 12 provided with a cental opening for passing the container, the edge of the opening being close to the said container wall 1 without contacting it, and a horizontal bottom 14. Assembly 12, 13, 14 constitutes the microwave cavity which may be made of a noncorrodible material such as stainless steel 18/8. Obviously wall 12 limits microwave exposure in the upper part of container 1 so as to protect the loading volume 15 against microwave action.

For instance the envelope is parallelpiped shaped. Cavity 13 is provided with four side openings cooperating with four waveguides for feeding the cavity with microwaves delivered from four generators, as waveguide 8 and magnetrons 9.

Figure 2:
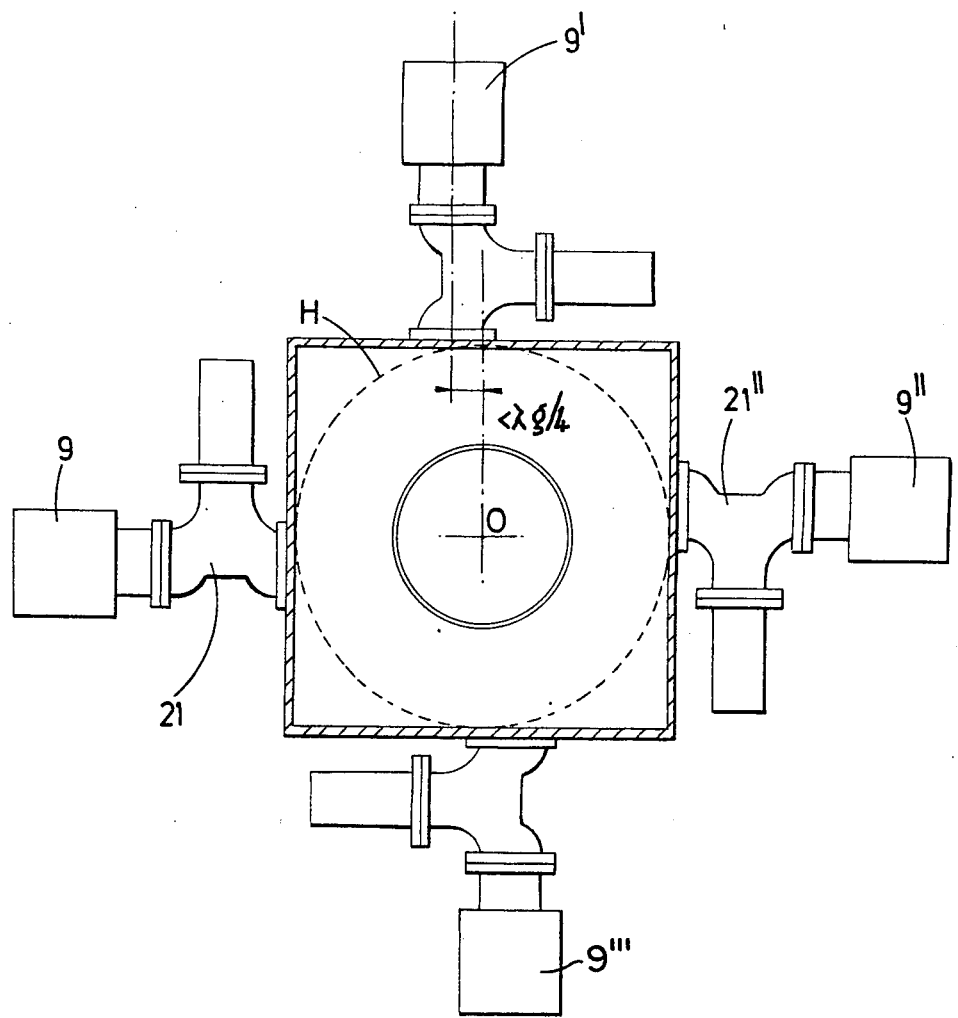
FIG. 2 is a top view of the oven shown in FIG. 1.

FIG. 2, which is a top view of the apparatus points out the respective position of the four magnetrons 9, 9', 9", 9'''. They are located on the respective faces of the envelope ordinarily spaced by 90° around longitudinal axis AA' of container 1, 3, 4. For a pair of waveguides facing each other the distance between their respective axes is comprised between 0 and λg/2.

The cross-sectional view of FIG. 1 illustrates the vertical level difference of waveguide axes which is between 0 and λg/2. The waveguide being located along a spiral line with respect to the axis of cylindrical container 1-3. The four magnetrons, each delivering 3 kilowatts are vertically arranged. The transmission is made through an antenna such as 10 for magnetron 9. Between each waveguide and each magnetron a conventional circulator such as a ferrite circulator may be mounted as circulator 21 between waveguide 8 shown in FIG. 3, the circulator 21 being positioned intermediate the magnetrons 9, 9', 9", 9''' and the waveguides 10 for deflecting and absorbing microwave energy transmitted back from the cavity.

The apparatus operates as follows. In loading space 15, container 1 is loaded with the solid product which will be processed for melting it. Solid particles are retained above grid 2. Cover 11 is closed insuring a tight seal with respect to ambient atmosphere. The four peripheral magnetrons are supplied. Antennas are simultaneously radiating. The radiated energy is transferred through individual guide cavity 13. Cavity 13 is matched to transmitted frequency of 2450 MHz.

Walls of container 1 are permeable to radiations. The contained dielectric solid mass is heated which causes solid particles to melt. The liquid flows through holes of grid 2, down to 3, then outside of the cavity through port 5. It may be collected as soon as it melts. The apparatus is loaded again with substances to be processed by removing cover 11 and loading upper part 15 of processing container.

When all the load of substances to be processed has been processed, there is no longer microwave energy absorption in the dielectric medium constituted by those substances. As a result all the energy flows back in circulators 21, 21', etc. Due to a thermocouple located, for instance, in water inside those circulators the switching off of magnetron supply circuit may be automatically provided above a certain threshold which corresponds to the end of the operation.

Figure 3:
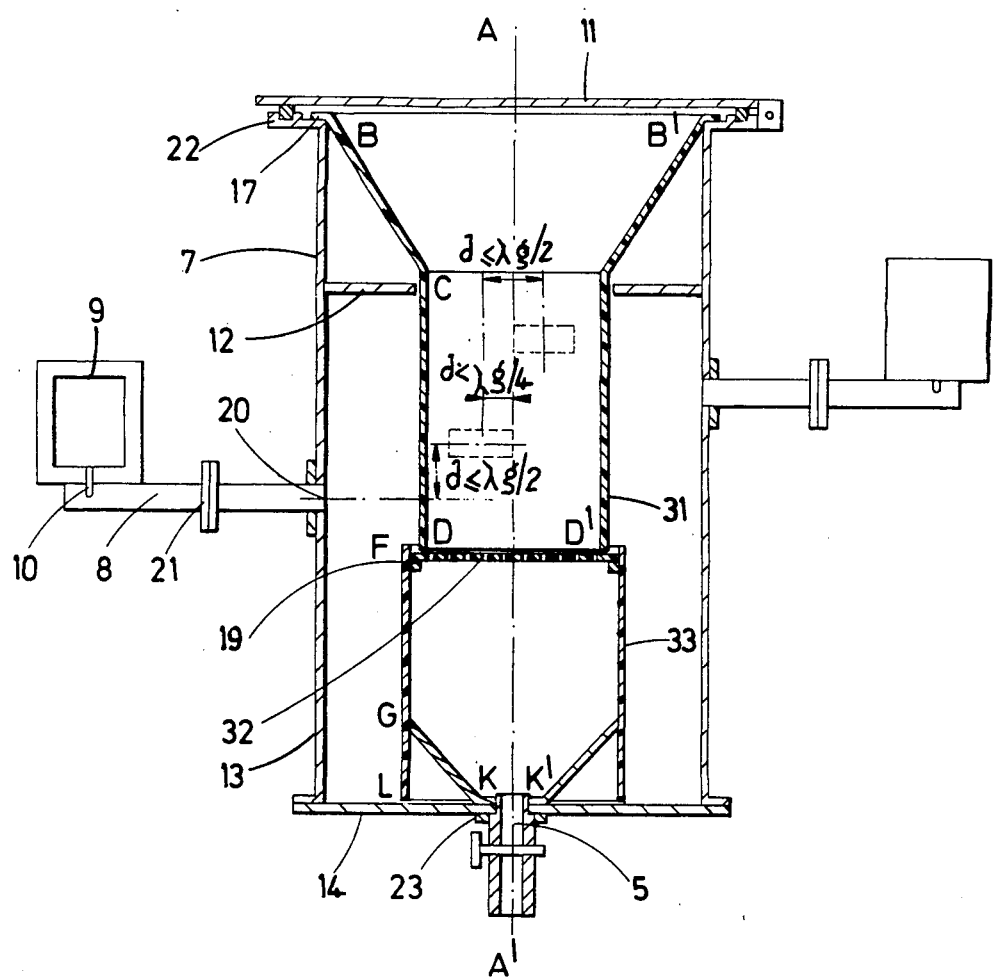
FIG. 3 is a cross-sectional view of another embodiment of the oven shown in FIG. 1.

FIG. 3 shows an alternative of the embodiment shown in FIG. 1, the same numerical references being used for indicating the same parts or pieces. The considered apparatus comprises a single piece envelope with a central body 7-13-14 closed by a removable cover 11. Four side openings and a bottom port 5 are provided in central body 7-13-14. Side openings, such as 20, are arranged as previously described in relation with the embodiment shown in FIGS. 1 and 2. Each side opening is provided with a waveguide, such as waveguide 8 matched to opening 20. Waveguide 8 is provided with circulator 21 and coupled to antenna 10 of magnetron 9.

The processing container is a surface of revolution about vertical axis A'A. It comprises three components, i.e. a first upper component 31, an intermediate component 32 and a lower component 33. Component 31 is supported by component 32. Component 31 has a generatrix BCD while component 33 has a generatrix FGKL. Each component is preferably molded and made of a material permeable to microwaves. Component 31 is hollow and comprises a frusto-conical portion BC above a cylindrical portion CD. Large basis BB' of frusto-conical portion BC constitutes the loading opening for loading container zone. Frusto-conical portion BC is provided at its upper end with a horizontal rim 17 bearing on upper folded edge 22 of upper part 7 of envelope 7-13-14. Cylindrical portion CD has a lower circular edge DD' resting on component 32. Component 32 is a circular grid made of polypropylene and having a diameter larger than diameter of portion CD. Component 33 comprises a portion FGK useful for containing substances and a portion GL having a purely mechanical function which is to increase stability of the said container inside microwave cavity. External surface FGL of 33 is cylindrical while portion GK defines a frusto-conical funnel. Opening KK' is threaded to be secured to cavity bottom 14. A port 5 passing through KK' is provided as an outlet for processed substances. Useful cylindrical portion FG has its inside wall provided with a circular projection 19 having a diameter slightly shorter than the outside diameter of grid 32 so as to constitute for grid 32 a support on which it is centered in the cylindrical portion of 33.

Useful cylindrical portion FG may advantageously be extended down to basis L of lower portion FGK so as to ensure a good seating of component 33 on general envelope bottom 14. The region under grid 32 inside of component 33 serves to discharge processed substances when port 5 is open.

In operation the embodiment shown in FIG. 3 has basically the same behavior as the embodiment shown in FIGS. 1 and 2. When melting of processed substances is completed after having discharged the apparatus, components 31 and 32 are removed after having opened rotatable cover 17, and replaced by new or cleaned similar components. A new substance is loaded into the apparatus and a new melting operation is carried on with another substance slightly different from the substance processed during the first operation. Component 33 is maintained as long as substances processed during two successive operations are similar enough to avoid any contamination. Of course in the case of two successive operations concerning different substances, it is simple and more efficient for avoiding any contamination to remove all the container components. In this case after having removed as already mentioned, components 31 and 32, component 33 must be unscrewed from apparatus bottom 14. Then through the upper opening of the envelope a new component 33 is mounted so that L and KK' rest on bottom 14. Component 33 is secured by screwing screw 23 in KK'. Then grid 32 is mounted on component 33 and centered with respect to component 33 on projection 19. Finally component 31 is mounted on edge DD' of grid 32 while horizontal upper rim 17 rests on horizontal rim 22 of body 7.

The three components 31, 32, 33 are in the described embodiment made of polypropylene preferably molded. Outside of the apparatus those components are easy to clean. The arrangement shown in FIG. 3 improves possibilities of technical application of the embodiment shown in FIGS. 1 and 2. Indeed the cost of such a polypropylene container as it is defined in its particular shape, is still rather high and it is practical in providing two sets of components according to this invention, to substitute one set for the other and to clean the stand-by set without substantially interrupting the successive operations at lost cost.

There are several advantages provided by the apparatus according to this invention such as the following:

more rapid heating which is time saving, homogeneous heating even when the solid mass is fragmented, the heating source does not radiate visible radiation and does not cause ambient heating. This advantage makes the apparatus suitable for processing photographic products in a dark room such as: bath preparation, gelatin melting, sensitive emulsion processing, and foot or pharmaceutic products, small sized apparatus, no contamination since there is no contact with other material, micromixing of the middle of the substances submitted to microwaves which increases product homogeneity. Absorption of microwave energy in region 3–4 by substances already processed makes it possible to maintain the substances in liquid form down to port 5.

Numerous applications of the invention may be considered such as: photography, drugs, laboratory processing, industry, high purity product processing, and the like. The inventive apparatus may, for instance, be utilized for melting and purifying within a single operation. In this case a filtering body permeable to microwaves is placed on the grid 2 or 32 and both melting and filtering of the substances loaded at solid state are performed at the same time.

More complex purification operations may also be envisaged with the inventive apparatus. Any possible alternative of the inventive apparatus and of the processing container may be considered. In particular a continuous loading of substances to be processed may be provided. In that case loading space 15 must have sufficient dimensions for containing a full operation load, and loading input must be protected against losses. Such arrangements remain within the scope of this invention as being known in the art.

While the principles of the present invention have hereabove been described in relation with specific embodiment, it is to be understood that the description has only been made by way of example and does not limit the scope of the invention.

What is claimed is:

1. An apparatus for processing materials by means of electromagnetic radiation comprising:
   means for generating electromagnetic radiation;
   a container for holding the material to be processed;
   an external metal casing for housing said container having a removable cover, sides and a bottom, said bottom having a passage therethrough for providing removal of said material from the apparatus; and
   an internal metal rim extending from the interior surface of the sides of said casing for at least partially limiting electromagnetic radiation to said container for the portion thereof between the top of said rim and the underside of said cover; and
   a plurality of openings through said casing below said rim;
   means for generating electromagnetic radiation comprising:
      a plurality of microwave generators having waveguides associated therewith communicating to the interior of said container below said rim through said openings;
      said container having a porous partition located therein to define a first zone thereabove within said container for processing said materials in a solid form and a second zone therebelow for processing materials in a liquid form; and said container having a loading passage portion above said rim at least partially protected from said electromagnetic radiation, a solid form processing portion between said rim and said porous partition, a liquid processing portion located intermediate said partition and the bottom of said container and a removing passage portion communicating with the passage through the bottom of said casing.

2. The apparatus of claim 1 wherein said microwave generators comprise a plurality of magnetrons surrounding said first and second zones and equidistantly located therefrom whereby said first and second zones comprise a microwave cavity in cooperation with said magnetrons.

3. The apparatus of claim 1 wherein said container is comprised of microwave transmitting material and is removably mounted within said metal casing.

4. The apparatus of claim 1 wherein said porous partition comprises a perforated grid.

5. The apparatus of claim 2 further including a circulator and control means for said circulator intermediate said magnetron and waveguide for deflecting and absorbing microwave energy transmitted back from said cavity.

6. The apparatus of claim 1 wherein said container comprises a single body plastic cylinder having a funnel-shaped opening at one end for receiving solid material therethrough and a tapered opening at the other end for passage of liquid material through said tapered opening, said container further including a plastic grid intermediate said funnel-shaped and said tapered openings.

7. The apparatus of claim 1 wherein said container comprises:

a first plastic cylinder funnel-shaped at one end and an opening of the same diameter as said first cylinder at the other end thereof;

a second plastic cylinder of larger diameter than said first cylinder and having an opening of the same diameter as said second cylinder at one end and a tapered opening less than the diameter of said second cylinder at the other end thereof; and a circular grid mounted proximate said one end of said second cylinder and supporting said first cylinder thereon whereby said material passes from said first cylinder to said second cylinder through said grid.

8. A two zone microwave oven comprising:

a metal casing having a hingably mounted cover at one end and an exit port at the opposite end, four waveguide passages equidistantly located around the periphery of said casing, and an inwardly extending microwave deflecting shelf member projecting from the interior surface of said casing;

a molded polypropylene cylinder removably mounted within said metal casing, said cylinder having a funnel-shaped opening at one end proximate said cover for receiving solid material therethrough, and a tapered opening at the opposite end for passing liquid material therethrough, a polypropylene grid attached to the inner wall of said cylinder intermediate said ends and perpendicular to the axis of said cylinder, for retaining solid material on one side of said grid and for passing liquid material through said grid; and four magnetron microwave transmitting tubes and antennas equidistantly placed around said casing and communicating with said casing by means of a waveguide whereby said casing provides a microwave cavity in cooperation with said tubes for supplying microwave radiation to material within said cylinder.

9. The microwave oven of claim 8, wherein said waveguides are positioned so that the vertical level distance between waveguide axes is between 0 and $\lambda g/2$.

10. The microwave oven of claim 9, wherein said waveguides are located along a helical line with respect to the axis of said cylinder.

* * * * *